United States Patent
Wakuda

Patent Number: 5,828,629
Date of Patent: Oct. 27, 1998

[54] OPTICAL RECORDING AND/OR REPRODUCING APPARATUS WITH STUPPING MOTOR DRIVE FREQUENCY WHICH IS LOWER THAN RESONANT FREQUENCY OF TRANSMISSION SYSTEM

[75] Inventor: Hiroshi Wakuda, Fukushima-ken, Japan

[73] Assignee: Alps Electric Co., Ltd., Tokyo, Japan

[21] Appl. No.: 556,730

[22] Filed: Nov. 13, 1995

[30] Foreign Application Priority Data

Nov. 17, 1994 [JP] Japan ................................. 6-283477

[51] Int. Cl.⁶ .............................. G11B 11/00; G11B 7/00
[52] U.S. Cl. ............................................ 369/13; 369/44.39
[58] Field of Search ................................. 369/275.1, 13, 369/275.2, 270, 271, 44.23, 44.37, 44.41, 44.39; 360/114, 59, 99.12, 99.08, 99.05, 99.04

[56] References Cited

U.S. PATENT DOCUMENTS 5,461,523  10/1995  Hoshi .................................. 360/99.12

FOREIGN PATENT DOCUMENTS 63-96782  4/1988  Japan .

Primary Examiner—Ali Neyzari
Attorney, Agent, or Firm—Guy W. Shoup; Patrick T. Beaver

[57] ABSTRACT

An optical recording and/or reproducing apparatus employing a stepping motor for driving an optical pickup for movement in radial directions of a disk. The frequency of a driving pulse signal for driving the stepping motor is lower than the resonant frequency of a transmission system for transmitting the driving force of the stepping motor to the optical pickup and higher than the reproducing feed speed.

2 Claims, 3 Drawing Sheets

OPTICAL RECORDING AND/OR REPRODUCING APPARATUS WITH STUPPING MOTOR DRIVE FREQUENCY WHICH IS LOWER THAN RESONANT FREQUENCY OF TRANSMISSION SYSTEM

BACKGROUND OF THE INVENTION

1. Field of the Invention

The present invention relates to an optical recording and/or reproducing apparatus employing a stepping motor for driving an optical pickup for use in connection with a CD (compact disk) for horizontal movement.

2. Description of the Related Art

A CD player, i.e., an optical recording and/or reproducing apparatus, reads information from a disk by an optical pickup comprising a plurality of optical elements including a semiconductor laser, a photodiode and an objective lens.

FIG. 3 is a typical view of a driving mechanism included in an optical recording and/or reproducing apparatus to drive an optical pickup for a feed operation and a feed-forward operation.

A CD 3 is mounted on a turntable 2 driven for rotation by a motor 1, and an optical pickup 4 is disposed near the CD 3. An automatic focusing mechanism 5 is mounted on the optical pickup 4 to maintain a fixed distance between an objective lens and the pit forming surface of the CD 3. Part of the optical pickup 4 is engaged with a feed screw shaft 6. The optical pickup 4 is moved transversely as viewed in FIG. 3, in a direction corresponding to the rotating direction of the feed screw shaft 6. At least one end of the feed screw shaft 6 is supported on a bearing member 7, and the other end of the feed screw shaft 6 is connected to the output shaft of a stepping motor 8. The optical recording and/or reproducing apparatus is provided with a CPU, not shown, for controlling the stepping motor 8 and other components.

The CD 3 is provided with data recording tracks arranged at fixed radial intervals. While the CD 3 is rotated by the motor 1, the stepping motor 8 is actuated every time a read (or write) operation is finished for reading information from (or writing information in) each track to shift the optical pickup 4 to a position corresponding to the adjacent track for feeding, i.e., movement toward the periphery of the CD 3, or for forwarding, i.e., movement toward the center of the CD 3.

As is generally known, basically, a voltage signal having a rectangular waveform is applied to the stepping motor for stepping motion. The dynamic characteristics of the stepping motor thus driven is nonlinear and the behavior of the stepping motor is expressed by a quadratic equation of motion. Accordingly, when a voltage is applied to the stepping motor, the rotative operation of the stepping motor includes vibrations.

FIG. 4 is a typical view showing a model of a transmission system of the driving mechanism of FIG. 3 for driving the optical pickup. Although the optical pickup 4 and the feed screw shaft 6 are connected mechanically, the mechanism connecting the optical pickup 4 and the feed screw shaft 6 can be represented by an equivalent model comprising a spring 9 having a spring constant, and a damper 10 capable of damping actions. Vibrations generated by the stepping motor 8 is transmitted to the optical pickup 4 through the spring 9 and the damper 10.

As mentioned above, when the stepping motor 8 is used as a driving means, vibrations generated by the stepping motor 8 are transmitted to the optical pickup 4 and, at a certain feed speed, i.e., the operating speed of the stepping motor 8, the system including the feed screw shaft 6 and the optical pickup 4 resonates. If the system resonates, accurate reading of the information recorded on the CD 3 cannot be achieved. For example, when reproducing musical information from the CD 3, the optical pickup 4 is unable to generate signals correctly representing sounds represented by the musical information.

SUMMARY OF THE INVENTION

Accordingly, it is a first object of the present invention to provide an optical recording and/or reproducing apparatus comprising an optical pickup, a stepping motor, and a transmission for transmitting the driving force of the stepping motor to the optical pickup, capable of transmitting the driving force of the stepping motor to the optical pickup at a driving frequency lower than its resonant frequency to eliminate the influence of disturbance that may act on the optical pickup.

A second object of the present invention is to provide an optical recording and/or reproducing apparatus comprising an optical pickup capable of fully exerting its inherent functions without being affected by the resonant frequency of a transmission system for transmitting the driving force of a stepping motor to the optical pickup.

If a transmission system for transmitting the driving force of a stepping motor to an optical pickup resonates with vibrations generated by the stepping motor, the optical pickup is unable to function normally. In a first aspect of the present invention, the optical pickup is driven at a driving frequency lower than the resonant frequency of the transmission system to eliminate the influence of the resonant frequency of the transmission system on the optical pickup.

When the optical pickup is driven for stepping feed, transitional disturbance acts on the optical pickup in the radial direction and, consequently, the optical pickup is unable to reproduce information from the CD correctly. However, the influence of the disturbance can be eliminated by driving the optical pickup by the stepping motor at a driving frequency lower than the resonant frequency of the transmission system.

When the driving frequency meets an inequality: f1>f2>f3; where f1 is the resonant frequency of the transmission system, f2 is the frequency of the driving pulse signal applied to the stepping motor during a acceleration from a stopped condition, and f3 is a frequency of the driving pulse signal during a reproduction operation in which information stored on the CD is reproduced by the optical pickup, the optical pickup is perfectly free from the influence of the resonant frequency and is able to fully exert its inherent functions.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

An optical recording and/or reproducing apparatus in a preferred embodiment according to the present invention comprises a stepping motor controlled for angular stepping rotation by a pulse signal, an optical pickup unit provided with an optical head, and a transmission mechanism for transmitting the driving force of the stepping motor to the optical pickup unit.

Figure 2A:
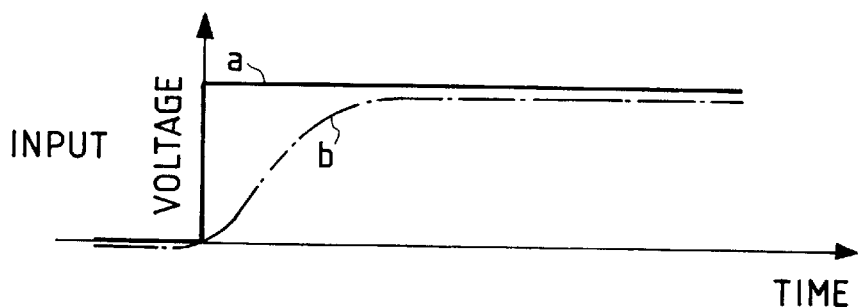
FIGS. 2A and 2B are graphs of assistance in explaining the relation between the waveform of an input voltage applied to a stepping motor included in the optical recording and/or reproducing apparatus embodying the present invention and displacement caused by the action of the stepping motor.
Figure 2B:
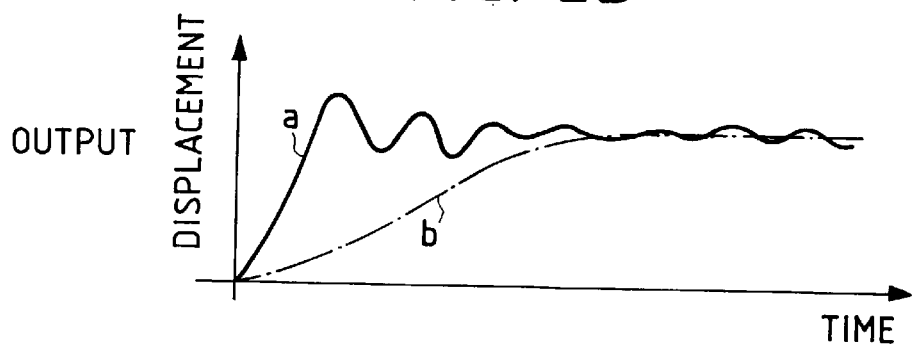
Figure 3:
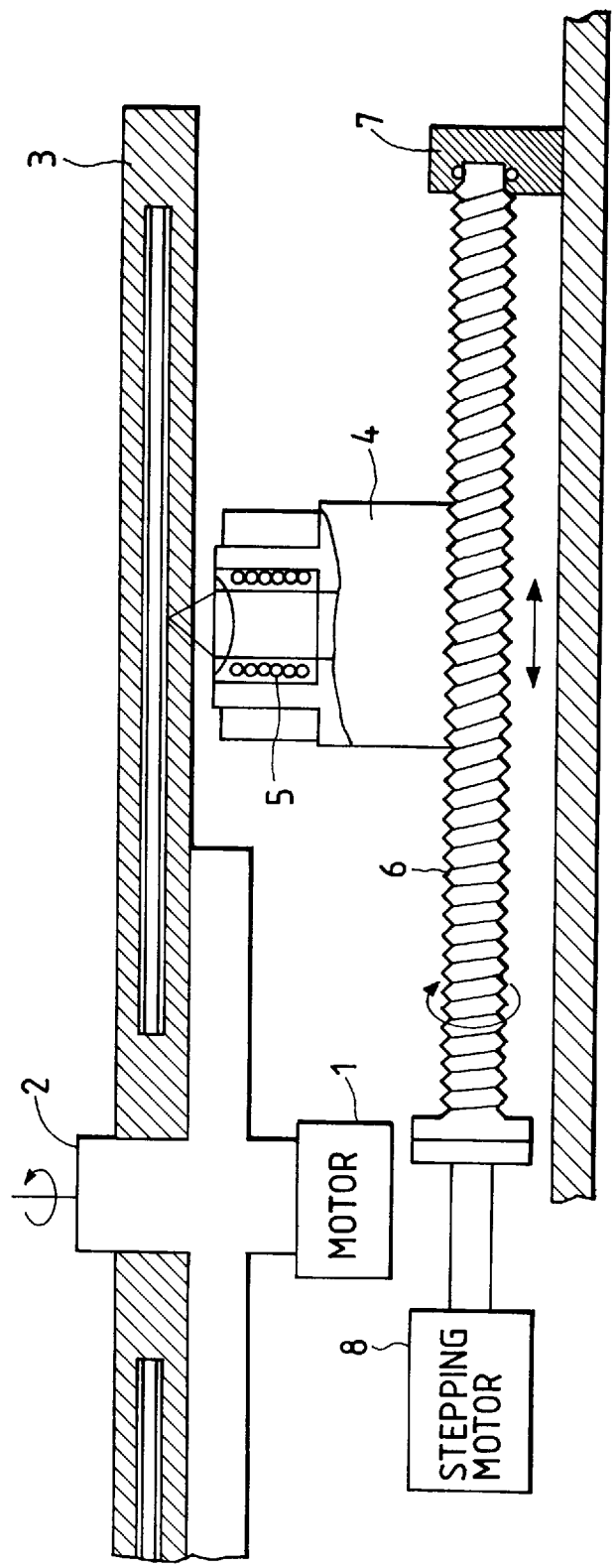
FIG. 3 is a schematic view of a conventional optical recording and/or reproducing apparatus.
Figure 4:
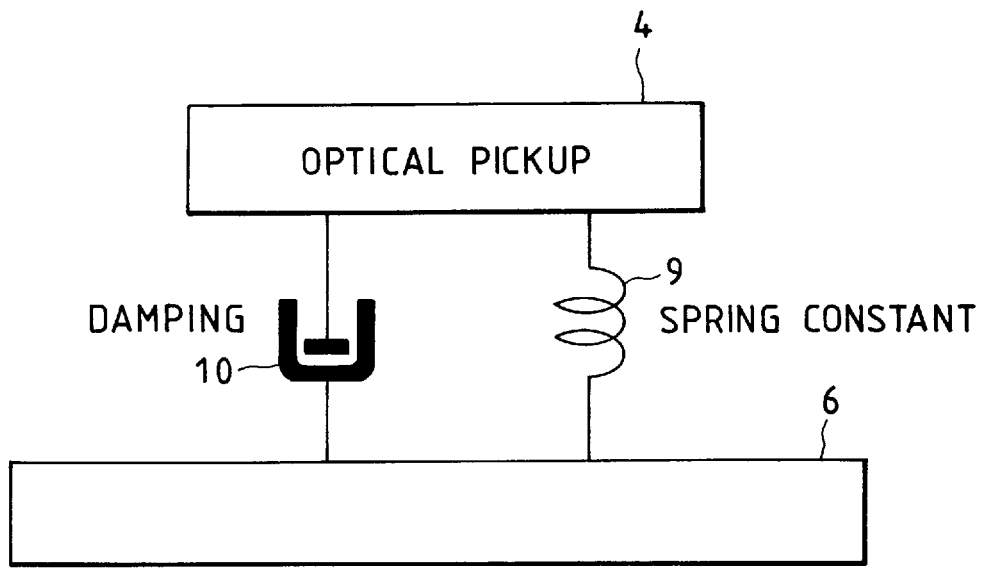
FIG. 4 is a typical view of a model of a transmission system for transmitting the driving force of a driving mechanism to an optical pickup.

Referring to FIGS. 2A and 2B, when a stepped input voltage (or current) as shown in FIG. 2A is applied to the stepping motor 8, a displacement, i.e., an output, having the waveform of a damped oscillation as shown in FIG. 2B occurs. When a gradually increasing voltage (or current) having a waveform b as shown in FIG. 2A is applied to the stepping motor 8, which means the reduction of the feed frequency of the stepping motor 8, a gradually increasing displacement as shown in FIG. 2B occurs.

Figure 1:
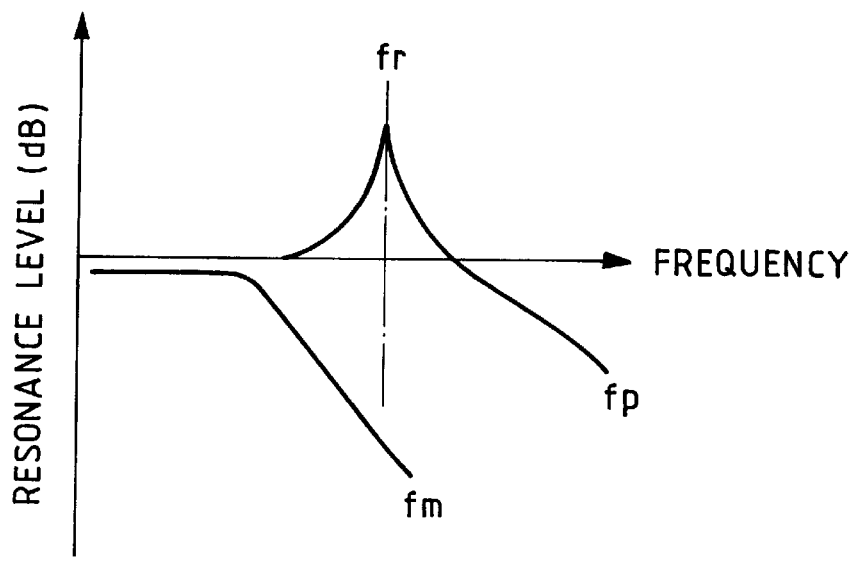
FIG. 1 is a graph of assistance in explaining the driving characteristic of a stepping motor included in an optical recording and/or reproducing apparatus in a preferred embodiment according to the present invention.

When an input voltage having a rectangular waveform a is applied to the stepping motor 8, the resulting displacement has a vibrating waveform, which causes the transmission system to vibrate and exerts large disturbance on the optical pickup 4. When the frequency of the vibration of the stepping motor 8 coincides with the resonant frequency of the transmission system, the transmission system resonates as shown in FIG. 1 and thereby the optical pickup 4 is caused to vibrate greatly. When a voltage having a waveform b is applied to the stepping motor 8, the magnitude of vibration of the displacement is very small.

However, the limitless reduction of the feed frequency of the stepping motor 8 is not allowed even if the displacement does not vibrate when the feed frequency is low. Therefore, the present invention drives the stepping motor 8 at a frequency fm lower than a characteristic fp having the resonant frequency fr of the transmission system resulting from the vibration of the stepping motor 8. More concretely, the feed frequency is determined so as to meet an inequality: f1>f2>f3; where f1 is the resonant frequency of the transmission system, f2 is the frequency of the driving pulse signal applied to the stepping motor during a acceleration from a stopped condition, and f3 is a frequency of the driving pulse signal during a reproduction operation in which information stored on the CD is reproduced by the optical pickup.

When the frequency is thus determined, the optical pickup 4 can be fed at a speed higher than the reproducing feed speed without exerting excessive disturbance on the optical pickup 4.

Since the construction of the optical recording and/or reproducing apparatus is the same as that of the conventional optical recording and/or reproducing apparatus, the description thereof will be omitted.

Although the invention has been described as applied to the optical recording and/or reproducing apparatus in which the stepping motor drives the optical pickup, the present invention is applicable to any kind of apparatus in which a driven member must be driven by a stepping motor without being affected by the vibration of the stepping motor.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An optical recording and/or reproducing apparatus for recording information onto and/or reproducing information from a disk, the apparatus comprising:

a stepping motor controlled by a driving pulse signal;

a transmission system; and an optical pickup provided with an optical head and driven by the stepping motor via the transmission system for movement in radial directions relative to the disk;

wherein the frequency of the driving pulse signal for controlling the stepping motor is lower than the resonant frequency of the transmission system for transmitting the driving force of the stepping motor to the optical pickup; and wherein the driving pulse signal includes one of a gradually increasing current and a gradually increasing voltage.

2. An optical recording and/or reproducing apparatus according to claim 1, wherein the frequency of the driving pulse signal meets an inequality:

$$f1>f2>f3$$

wherein f1 is the resonant frequency of the transmission system, f2 is the frequency of the driving pulse signal during acceleration from a stopped condition, and f3 is a frequency of the driving pulse signal during a reproduction operation in which information is reproduced from the disk by the optical pickup.

* * * * *

UNITED STATES PATENT AND TRADEMARK OFFICE
CERTIFICATE OF CORRECTION

PATENT NO. : 5,828,629
DATED : October 27, 1998
INVENTOR(S) : Hiroshi Wakuda

It is certified that error appears in the above-indentified patent and that said Letters Patent is hereby corrected as shown below:

In the Title Page
On title page, item [54] and
    In column 1, line 3, replace "STUPPING" with –STEPPING––.

Signed and Sealed this

Thirtieth Day of March, 1999

Attest:

Q. TODD DICKINSON

Attesting Officer     Acting Commissioner of Patents and Trademarks